Sept. 16, 1924.                    1,508,835
W. A. CONTANT ET AL
GRADING OR SORTING MACHINE
Filed March 7, 1924
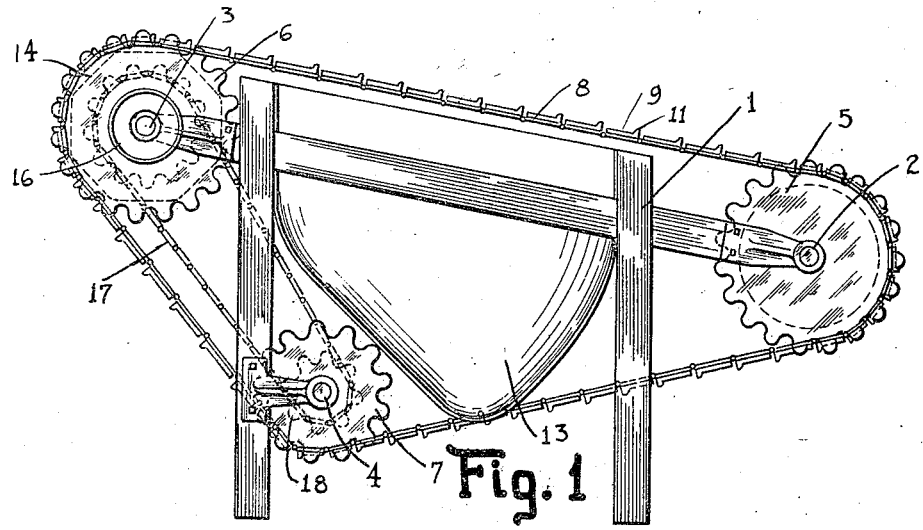
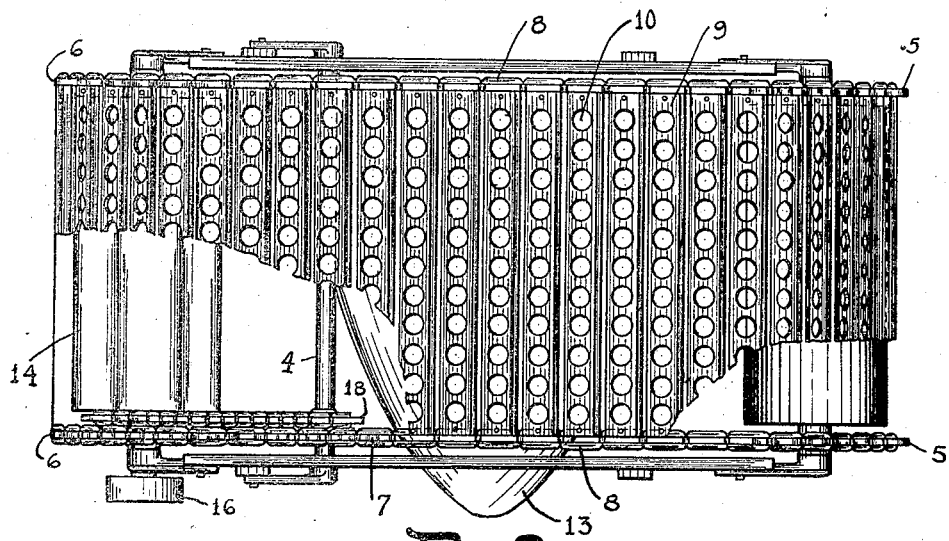
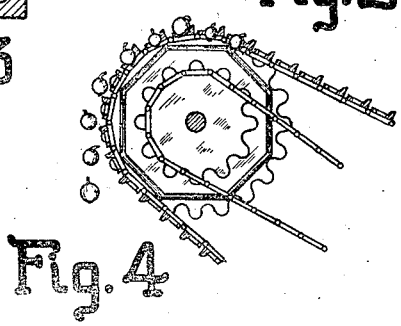
INVENTORS
William A. Contant
Lloyd E. Contant
BY
THEIR ATTORNEYS.

Patented Sept. 16, 1924.

1,508,835

UNITED STATES PATENT OFFICE.

WILLIAM A. CONTANT AND LLOYD E. CONTANT, OF ROCHESTER, NEW YORK, ASSIGNORS OF ONE-HALF TO F. B. PEASE COMPANY, OF ROCHESTER, NEW YORK, A CORPORATION OF NEW YORK.

GRADING OR SORTING MACHINE.

Application filed March 7, 1924. Serial No. 697,630.

*To all whom it may concern:*

Be it known that we, WILLIAM A. CONTANT and LLOYD E. CONTANT, citizens of the United States, and residents of Rochester, in the county of Monroe and State of New York, have invented certain new and useful Improvements in Grading or Sorting Machines, of which the following is a specification.

The present invention relates to grading or sorting machines and more particularly to the type in which there is provided an endless conveyor formed with grading or sorting openings. An object of this invention is to provide a novel means for displacing the articles from the openings of the endless conveyor. Still another object of the invention is to provide a displacing drum which has a different peripheral speed from the surface speed of the conveyor. Still another object of the invention is to provide a displacing drum at the discharge end of the conveyor to cooperate with the conveyor as the latter passes downwardly at such discharge end. A still further object is to provide an improved endless conveyor.

To these and other ends, the invention consists of certain parts and combinations of parts, all of which will be hereinafter described; the novel features being pointed out in the appended claims.

In the drawings:

Fig. 1 is a side view of a grading or sorting machine constructed in accordance with this invention;

Fig. 2 is a plan view with parts of the conveyor broken away;

Fig. 3 is a sectional view through one of the conveyor slats; and

Fig. 4 is a sectional view showing the cooperation between the displacing drum and the conveyor.

Referring more particularly to the drawings, 1 indicates a frame having three shafts 2, 3 and 4 arranged thereon, the shaft 2 carrying two sprocket wheels 5, the shaft 3 carrying two sprocket wheels 6 and the shaft 4 carrying two sprocket wheels 7. About these sprocket wheels the conveyor passes. The conveyor, in this instance, embodies two sprocket chains 8 connected by slats 9, each of which has a longitudinal series of grading openings 10 and a longitudinal rib 11 which serves to align the articles with the grading openings and prevents them rolling down the conveyor and displacing other articles on the conveyor. The shafts 2, 3 and 4 are so placed that the uppermost lap of the conveyor is inclined, the shaft 3 being in a plane higher than the shaft 2, whereas the lowermost lap of the conveyor forms an angle due to the shaft 4 being situated below the shafts 2 and 3 and in a vertical plane between said shafts. One of these shafts may be driven in any suitable manner. In this instance, the shaft 3 has a pulley 12 thereon to which any suitable source of power may be connected. On the frame part between the upper and lower laps of the conveyor, a chute 13 is arranged through which the articles passing through the conveyor may be discharged at one side of the conveyor to any suitable receptacle, those articles which are too large to pass through the grading openings 10 being carried upwardly to the upper end of the conveyor.

Some of the articles have a tendency to wedge or bind in the grading openings and in order to effectively discharge such articles from the grading openings, a displacing means is provided on the discharge end of the conveyor. In this instance, this displacing means comprises a drum 14 covered with a soft yielding material 15 and, in this instance, mounted to turn on the shaft 3 independently of said shaft. The purpose of so mounting the drum is to permit the latter to have a different peripheral speed from the surface speed of the conveyor, so that the relative movement between the periphery of the drum and the conveyor takes place. In this instance, the periphery of the drum moves at a greater speed than the conveyor, this result being secured by providing a pulley 16 on the drum and connecting said pulley by means of a sprocket chain 17 with a sprocket wheel 18 on the shaft 4, so that the drum is driven from the shaft 4 which in turn is driven from the conveyor.

From the foregoing it will be seen that there has been provided a conveyor in which a displacing means is employed, operating at a different speed from the speed of the conveyor. This displacing means is arranged at the discharge end of the conveyor so that as the conveyor passes downwardly at the discharge end the articles will be acted on. In this instance, the displacing means is mounted to turn on a shaft which also supports the conveyor at the discharge end and the displacing drum is driven from the shaft which in turn is driven from the conveyor. A conveyor is provided with transverse ribs adjacent each row of grading openings to align the articles with the grading openings and to prevent the articles rolling down the conveyor.

What we claim as our invention and desire to secure by Letters Patent is:

1. A grader or sorting machine comprising an endless conveyor having grading openings and having its upper lap arranged on an incline and having the upper end of the incline portion turning downwardly, and a drum arranged under the upper lap of the conveyor at the downwardly turned portion and operating at a different peripheral speed from the surface speed of the conveyor to displace articles from the openings in the conveyor at such downwardly turned portion.

2. A grading or sorting machine comprising an endless conveyor, two sprockets meshing with the conveyor, a shaft for supporting said sprockets, and a drum for displacing articles from the conveyor mounted to turn on said shaft.

3. In a grading or sorting machine, the combination with an endless conveyor embodying two sprocket chains, and means connecting said chains and formed with grading openings, of two shafts one arranged in a higher plane than the other and each having two sprockets thereon meshing with the sprocket chains of the conveyor, the uppermost sprockets being situated at the discharge end of the conveyor, a drum mounted on the uppermost shaft between the sprockets to turn on said shafts, and means for turning said drum.

4. In a grading or sorting machine, the combination with an endless conveyor embodying two sprocket chains, and means connecting said chains and formed with grading openings, of two shafts one arranged in a higher plane than the other and each having two sprockets thereon meshing with the sprocket chains of the conveyor, the uppermost sprockets being situated at the discharge end of the conveyor, a drum mounted on the uppermost shaft between the sprockets to turn on said shafts, and means for turning said drum, said means comprising a third shaft, two sprockets on the third shaft meshing with the sprocket chains of the conveyor, and a driving connection between said last mentioned shaft and the drum.

WILLIAM A. CONTANT.
LLOYD E. CONTANT.